United States Patent
Smith

[15] 3,663,282
[45] May 16, 1972

[54] COATING COMPOSITIONS FOR ALKALI SURFACES

[72] Inventor: Ronald L. Smith, Ballston Lake, N.Y.

[73] Assignee: General Electric Company

[22] Filed: July 1, 1970

[21] Appl. No.: 51,731

[52] U.S. Cl.............................................106/287, 117/124
[51] Int. Cl.......................................C09d 3/82, C09d 3/00
[58] Field of Search..........................117/72, 124; 106/287; 260/46.5 G

[56] References Cited

UNITED STATES PATENTS

| | | | |
|---|---|---|---|
| 3,498,824 | 3/1970 | Chadha | 117/124 F |
| 3,108,898 | 10/1963 | Nitzsche | 260/33.4 |
| 3,388,089 | 11/1968 | Brown | 106/287 C |

*Primary Examiner*—Theodore Morris
*Attorney*—Donald J. Voss, E. Philip Koltos, Frank L. Neuhauser, Oscar B. Waddell and Joseph B. Forman

[57] ABSTRACT

A primer composition for protecting polysiloxane polymers from alkali material comprising 1.0–10.0 percent by weight of $(RO)_n SiO_{(4-n/2)}$; 15.0–40.0 percent by weight of $(R'O)_4 Si$; 1.0–10.0% by weight of $Ti(OR^2)_4$ or $Ti(OR^2)_x$; 1.0–5.0 percent by weight of

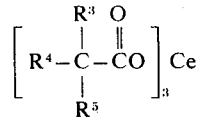

and 35–72 percent by weight of a solvent wherein R, R', R², R³, R⁴, and R⁵ are monovalent hydrocarbon radicals, $x$ is at least 5 and the value of $n$ may vary from 2.25 to 2.67.

14 Claims, No Drawings

COATING COMPOSITIONS FOR ALKALI SURFACES

BACKGROUND OF THE INVENTION

This invention relates to siloxane compositions and, in particular, to siloxane compositions useful as primers for protecting polysiloxane polymers from alkali surfaces.

Presently, room temperature vulcanizable silicone rubber has been used to coat lightbulbs and other glass surfaces. The coating on the lightbulbs is a safety coating which prevents the glass from shattering should the lightbulb coated with room temperature vulcanizable rubber break. Such glass bulbs are particularly desirable in pharmaceutical and other types of manufacturing plants where it is desirable that the glass particles do not scatter and become mixed with the products being produced. The lightbulbs are coated by simply dipping them into a bath of the polymer and then the silicone rubber is cured by exposure to the atmosphere. However, polysiloxane polymers and, in particular, room temperature vulcanizable silicone rubber are attacked by alkali material such that alkali material causes the polysiloxane polymer to rapidly deteriorate at high temperatures. A primer coating is applied to the alkali glass of which lightbulbs are constructed so as to protect the polysiloxane polymer from the alkali glass and to cause the polysiloxane polymer to adhere satisfactorily to the glass surface.

Rubbers other than silicone rubber are not used to coat glass structures and, in particular, lightbulbs for a number of reasons. Ordinary rubbers are charred or quickly oxidized by the high temperatures to which the lightbulb glass is exposed to while silicone rubber can withstand the high temperatures. Further, silicone rubber is transparent and allows the passage of light there through while ordinary rubbers are usually opaque. In addition, silicone rubber can usually be applied or smoothed over surfaces with intricate contours.

It is one object of the present invention to provide a primer composition for alkali surfaces that will protect room temperature vulcanizable silicone rubber from decomposition.

It is another object of the present invention to provide a primer composition that forms a uniform film with good transparency on alkali surfaces and such that polysiloxane rubber will form a good bond with the film and be protected from deterioration at high temperatures.

It is another aim of the present invention to provide a primer composition that forms a clear, strong film on alkaline surfaces so that polysiloxane rubber can be bonded thereto with good adhesion and be protected from deterioration at high temperatures. These and other objects of the present invention will be obtained in accordance with the disclosure described below.

SUMMARY OF THE DISCLOSURE

In accordance with the present invention there is provided a primer composition for protecting polysiloxane polymers from alkali surfaces comprising 1.0–10.0 percent by weight of a partially hydrolyzed silicate having the average unit formula:

(1) $(RO)_nSiO_{(4-n)/2}$ 

15.0–40.0 percent by weight of (2) $(R'O)_4Si$ 

1.0–10.0 percent by weight of a compound selected from the group of (3) $Ti(OR^2)_4$ 

and (4) $Ti(OR^2)_x$ 

1.0–5.0 percent by weight of a cerium compound having the formula:

(5) 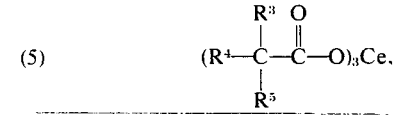
$$(R^4-\underset{\underset{R^5}{|}}{\overset{\overset{R^3}{|}}{C}}-\overset{O}{\overset{\|}{C}}-O)_3Ce,$$

and 75–72 percent by weight of a solvent wherein R, R', and R² are monovalent hydrocarbon radicals, while R³, R⁴, and R⁵ are alkyl or alkenyl radicals of not more than six carbon atoms, $x$ has a value of at least 5 and $n$ may vary from 2.25 to 2.67. Preferably, R, R' are ethyl while R² is butyl. The preferred range of concentration of $(RO)_nSiO_{(4-n)/2}$ is 1.5–3.0 percent by weight while the preferred range of the cerium compound is 2.0 to 3.0 percent by weight. Further, the preferred range of concentration for the $(R'O)_4Si$ is 20.0–30.0 percent by weight and the preferred range of concentration for the $Ti(OR^2)_4$ or $Ti(OR^2)_x$ compounds is 5.0–8.0 percent by weight.

DESCRIPTION OF THE PREFERRED EMBODIMENT

In the above formulas (1), (2), (3), and (4), R, R¹, and R² can be, for example, mononuclear and binuclear aryl, such as phenyl, naphthyl, benzyl, tolyl, xylyl, 2,6-di-t-butylphenyl, 4-butylphenyl, 2,4,6-trimethylphenyl, biphenyl and ethylphenyl; halogen-substituted mononuclear and binuclear aryl, such as 2,6-di-chlorophenyl, 4-bromophenyl, 2,5-di-fluorophenyl, 4,4'-di-chlorobiphenyl, 2'-chloro-naphthyl, 2,4,6-trichlorophenyl and 2,5-dibromophenyl; nitro-substituted mononuclear and binuclear aryl, such as 4-nitrophenyl and 2,6-di-nitrophenyl; alkoxy-substituted mono and binuclear aryl, such as 4-methoxyphenyl, 2,6-dimethoxyphenyl, 4-t-butoxyphenyl, 2-ethoxyphenyl, 2-ethoxynaphthyl and 2,4,6-trimethoxyphenyl; alkyl such as methyl, ethyl, n-propyl, isopropyl, n-butyl, sec-butyl, isobutyl, tert-butyl, amyl, hexyl, heptyl, octyl, nonyl, decyl and dodecyl, alkenyl such as vinyl, allyl, n-butenyl-1, n-butenyl-2, n-pentenyl-2, n-hexenyl-2, 2,3-dimethylbutenyl-2, n-heptenyl, n-decenyl and n-dodecenyl; alkynyl such as propargyl and 2-butynyl; haloalkyl such as chloromethyl, iodomethyl, bromomethyl, fluoromethyl, chloroethyl, iodoethyl, bromoethyl, fluoroethyl, trichloromethyl, diiodoethyl, tribromomethyl, trifluoromethyl, dichloroethyl, chloro-n-propyl, bromo-n-propyl, iodoisopropyl, bromo-n-butyl, bromo-tert-butyl, 1,3,3-trichlorobutyl, 1,3,3-tribromobutyl, chloropentyl, bromopentyl, 2,3-dichloropentyl, 3,3-dibromopentyl, chlorohexyl, bromohexyl, 2,4-dichlorohexyl, 1,3-dibromohexyl, 1,3,4-trichlorohexyl, chloroheptyl, bromoheptyl, fluoroheptyl, 1,3-dichloroheptyl, 1,4,4-trichloroheptyl, 2,4-dichloromethylhaptyl, chlorooctyl, bromooctyl, iodooctyl, 2,4-dichloromethylhexyl, 2,4-dichlorooctyl, 2,4,4-trichloromethylpentyl and 1,3,5-tribromooctyl; haloalkenyl such as chlorovinyl, bromovinyl, chloroallyl, bromoallyl, 3-chloro-n-butenyl-1, 3-chloro-n-pentenyl-1, 3-fluoro-n-heptenyl-1, 1,3,3-trichloro-n-heptenyl-5, 1,3,5-trichloro-n-octenyl-6 and 2,3,3-trichloromethylpentenyl-4; haloalkynyl such as chloropropargyl and bromopropargyl; nitroalkyl such as nitromethyl, nitroethyl, nitro-n-propyl, nitro-n-butyl, nitropentyl and 1,3-dinitroheptyl; nitroalkenyl such as nitroallyl, 3-nitro-n-butenyl-1 and 3-nitro-n-heptenyl-1; nitroalkynyl such as nitropropargyl; alkoxyalkyl and polyalkoxyalkyl such as methoxymethyl, ethoxymethyl, butoxymethyl, methoxyethyl, ethoxyethyl, ethoxyethoxyethyl, methoxyethoxymethyl, butoxymethoxyethyl, ethoxybutoxyethyl, methoxypropyl, butoxypropyl, methoxybutyl, butoxybutyl, methoxypentyl, butoxypentyl, methoxymethoxypentyl, butoxyhexyl, methoxyheptyl and ethoxyethoxy; alkoxyalkenyl and polyalkoxyalkenyl such as ethoxyvinyl, methoxyallyl, butoxyallyl, methoxy-n-butenyl-1, butoxy-n-pentenyl-1 and methoxyethoxy-n-heptenyl-1; alkoxyalkynyl and polyalkoxyalkynyl such as methoxypropargyl; cycloalkyl, cycloalkenyl and alkyl, halogen, alkoxy and nitro-substituted cycloalkyl and cycloalkenyl such as cyclopentyl, cyclohexyl, cycloheptyl, cyclooctyl, cyclononyl, 6-methylcyclohexyl, 2,5-dimethylcycloheptyl, 4-butylcyclopentyl, 3,4-dichlorocyclohexyl, 2,6-dibromocycloheptyl, 6-methoxycyclooctyl, 2-nitrocyclopentyl, 1-cyclopentenyl, 3-methyl-1-cyclopentenyl, 5-methoxy-1-cyclopentenyl, 3,4-dimethyl-1-cyclopentenyl, 2,5-dimethoxy-1-cyclopentenyl, 5-methyl-5-cyclopentenyl, 3,4-dichloro-5-cyclopentyl, 5-(tert-butyl)-1-cyclopentenyl, 2-nitro-1-cyclohexenyl, 1-cyclohexenyl, 3-methyl-1-cyclohexenyl, 3,4- dimethyl-1-cyclohexenyl and 6-methoxy-1-cyclohexenyl; cyanoalkyl such as cyanomethyl, cyanoethyl, cyanobutyl and cyanoisobutyl; and aralkyl such as benzyl. The radicals represented by $R^3$, $R^4$, $R^5$ are preferably alkoxy, alkenyl, alkynyl, haloalkyl, haloalkenyl and haloalkynyl of generally not more than 9 carbon atoms and preferably not more than six carbon atoms.

Preferably, the radicals represented by R, R', and $R^2$ do not have more than eight carbon atoms.

In the formulas (1) and (2), R and R' are preferably ethyl such that formula (1) represents a partially polymerized ethyl silicate. The radicals R and R' may also preferably be methyl or isopropyl. This partially hydrolyzed polymer is prepared by partially hydrolyzing ethylortho-silicate or the silicate of formula (2). Such a partially hydrolyzed ethyl silicate is sold under the trademark ES–40 by Union Carbide Corporation, Park Avenue, New York, New York. Most of the ES–40 sold has approximately 42 percent $SiO_2$ and on the average there are five Si per molecule.

The silicate of formula (2) is prepared by reacting an alkanol of the formula:
(6)     R'OH
with
(7)     $SiCl_4$
in the presence of pyridine as an acid acceptor. The pyridine precipitates out of the reaction mixture by adding a salt to the solution. The precipitate is then filtered out and the remaining liquid is washed with water and the organic phase separated from the aqueous phase to remove all water soluble impurities. The preferable compound in the present invention is ethylorthosilicate, that is when R' in formula (2) is ethyl.

The titanates of formulas (3) and (4) are prepared by reacting an alcohol of the formula:
(8)     $R^2OH$
with
(9)     $TiCl_4$
in the presence of pyridine as the acid acceptor. The general procedure followed is the same as that used in obtaining compounds of the formula (2). The polymers of formula (4) are obtained by partially hydrolyzing the titanate of formula (3). Preferably, $R^2$ is butyl and the preferred compounds of formula (3) is tetrabutyl titanate while the preferred polymers of formula (4) is a tetrabutyl titanate polymer. The tetrabutyl titanate compound and tetrabutyl titanate polymer are sold under the trademarks Tyzor TBT and Tyzor PB by duPont deNemours & Co., of Wilmington, Delaware. Tyzor PB is preferred in the primer composition over Tyzor TBT in that the primer composition cures to a crystal clear coating. When the Tyzor TBT is in the primer composition, the primer coating sets to form a coating that has a certain amount of haziness. Further, the primer composition with Tyzor PB tends to form a more tenacious coating that adheres well to the underlying glass surface.

One of the most important ingredients in the primer composition is the cerium compound of formula (5). The preferred compound of formula (5) is cerium neodecanoate whose formula is:

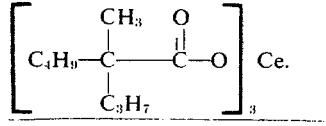

This compound is manufactured by Sheppard Chemical Co., located in Cincinnati, Ohio. Generally 1.0–5.0 percent by weight of cerium neodeconoate is used in the composition and preferably 2.0 to 3.0 percent. When less than the above range is used, the sufficient protection is not afforded to the polysiloxane rubber to prevent its deterioration at high temperatures. If more than 5.0 percent is used, the additional amount of cerium neodeconoate does not aid the desired properties of the primer composition.

Generally, 1.0 to 10.0 percent by weight of the polymer of formula (1) is used in the primer composition and preferably 1.5–3.0 percent by weight. If less than 1.0 percent by weight is used therein, a hard tenacious coating is not formed. If more than 10.0 percent by weight is used then the primer composition coating does not set to a hard finish.

With respect to the compound of formula (2), generally there is present in the composition 15.0 to 40.0 percent by weight of the compound and preferably 20.0 to 30.0 percent by weight. If less than 15.0 percent by weight is used, the primer composition will not cure to a hard finish. If more than 40.0 percent by weight of the compound is used, then the primer composition will not be sufficiently tenacious on the glass surface.

In the case of the compound of formula (3) and the polymer of formula (4), generally 1.0 to 10.0 percent by weight is used in the primer composition and preferably 2.0 to 3.0 percent by weight. When less than 1.0 percent by weight of the compound or the polymer is used in the composition, then the coating is not hard or sufficiently tenacious. If more than 10.0 percent by weight of the compound or the polymer is used, then the coating is not clear enough.

The rest of the composition is composed of a solvent which may be any solvent which is inert to the other constituents in the composition. Examples of such solvents are toluene, xylene, acetone, benzene, alcohols and mineral spirits. The polymer of formula (1) and the compound of formula (2) are added to and dissolved in the solvent. Then the compound or polymer of formulas (3) and (4) are added to the solvent and finally the cerium compound is placed into solution to form the primer composition.

The glass surface to which the primer composition is applied is carefully cleaned and then the composition is applied thereon to a thickness of 1–5 mm. The solvent is then allowed to evaporate leaving a hard, tenacious, clear, primer coating on the glass. The glass bulb or the glass articles are then ready to be immersed or coated with solutions of polysiloxane rubber.

The compositions of this invention can be used to protect heat vulcanizable silicone rubber from alkali surfaces, as well as room temperature vulcanizable silicone rubbers. Room temperature vulcanizable rubber is preferred to coat glass surfaces because of the ease in processing. One preferred type of room temperature vulcanizable silicone rubber that can be used to coat glass surfaces is described below.

The room temperature vulcanizable silicone rubber comprises a base polymer which can be formed from a single species or a plurality of species and are liquids having a viscosity of from 200 centistokes to 1,500 penetration at 25° C. These base polymers contain an average of from about 1.85 to 2.0 1 silicon-bonded organic radicals per silicon atom with the organic radicals being selected from the class consisting of monovalent hydrocarbon radicals, halogenated monovalent hydrocarbon radicals and cyanoalkyl radicals, with the organic radicals being attached to silicon through silicon-carbon linkages and with there being present on the base polymer from about 0.02 to 2.0 percent by weight silicon-bonded hydroxyl groups.

One particularly useful type of liquid organopolysiloxane base polymer is the material having the formula:
(10)     $HO-[R_2^6SiO]_n-H$
wherein $R^6$ is a member selected from the class consisting of monovalent hydrocarbon radicals, mononuclear hydrocarbon radicals, halogenated monovalent hydrocarbon radicals and cyanoalkyl radicals and n has a value of from about 20 to 3,000 or more.

In addition to the linear silanol chain-stopped diorganopolysiloxane of formula (10), the base polymer can also have some molecules containing linear diorganosiloxane chains which are all terminated at one end with triorganosiloxane units having the formula:
(11)     $(R^6)_3SiO_{0.5}$ with the other end of the chain being terminated by silanol groups where $R^6$ is as previously defined. The polymer chains can also contain some molecules containing monoorganosiloxane units having the formula:

(12) $\qquad R^6SiO_{1.5}$ where $R^6$ is as previously defined. In any case, it is necessary that the organopolysiloxane base polymer have a viscosity in the range of from about 200 centistokes to 1,500 penetration and preferably in the range of from about 2,000 to 50,000 centistokes at 25° C, with the amount of silicon-bonded hydroxyl groups being equal to at least about 0.02 to 2.0 percent by weight.

The preferred organo radicals represented by $R^4$ in the organopolysiloxane of formula (10) are phenyl and methyl.

There is mixed with the diorganopolysiloxane of formula (10) an organotriacyloxysilane having the formula:

(13) $\qquad R^7Si(OY)_3$ where $R^7$ is a member selected from the class consisting of monovalent saturated and unsaturated hydrocarbon radicals, halogenated monovalent hydrocarbon radicals, cyano radicals and Y is a saturated aliphatic monoacyl radical of a carboxylic acid. The radical $R^7$ can represent alkyl, aryl, aralkyl, alkoxy, alkynyl, alkenyl and cycloalkyl, acyloxyalkyl and acyloxyalkenyl radicals. Further, a mixture of organotriacyloxysilanes of formula (13) may be used where $R^7$ may represent different radicals.

These mixtures or compositions are stable for several years at room temperature in the absence of moisture, but upon exposure to moisture normally present in the atmosphere, the compositions cure to a tack-free state within about one-half hour and are completely cured to solid, elastic silicone rubbers within almost 24 hours. The cure can be accelerated with heat.

The room temperature vulcanizing silicone rubber compositions are prepared by mixing the polymer, fillers and additives under vacuum with heat. Since the organotriacyloxysilane of formula (13) tends to hydrolyze upon exposure to the atmosphere, care is exercised to exclude moisture during the mixing of the base with the compound of formula (13). Likewise, care should be exercised that the mixture of the organopolysiloxane base polymer and the organotriacyloxysilane is maintained under substantially anhydrous conditions if it is desired to store the mixture for an extended period of time in a liquid state prior to conversion of the material to the solid, cured, elastic silicone rubber state. On the other hand, if it is desired to permit the mixture to cure immediately upon addition of the organotriacyloxysilane to the liquid organopolysiloxane, no special precautions need be taken and the radicals can be mixed and placed in the forms or shapes which it is desired the material to be cured.

In coating lightbulbs the organotriacyloxysilane is mixed with the liquid organopolysiloxane in an aliphatic solvent under anhydrous conditions and the bulbs are dipped into the mixture and then passed out to the atmosphere where they are cured by moisture or by heat.

The relative amounts of the organopolysiloxane base polymer and the organotriacyloxysilane employed in producing compositions which upon exposure to moisture cure to the solid, elastic state vary within broad limits. Generally, the amount of organotriacyloxysilane is from 1.2 to 6.0 parts per 100 parts of the base polymer. The temperature at which the organotriacyloxysilane of formula (13) is added to the reaction mixture is generally immaterial with the addition generally being effected at a temperature of from about 20° to 80° C.

It is often desirable to modify the compositions of the room temperature vulcanizable silicone rubber by addition of various materials which act as extenders or which change various properties, such as cure rate, color or cost. For example, if it is desired to reduce the time required for complete cure by a factor of from about 2 to 5 without effecting the work life of the room temperature vulcanizing composition, the composition can be modified by the incorporation of a minor amount of a carboxylic acid salt of a metal ranging from lead to manganese, inclusive, in the electromotive series of metals. The particular metals included within this scope are lead, tin, nickel, cobalt, iron, cadmium, chromium, zinc and manganese. The specific metal ion which is preferred is tin. The carboxylic acids from which the salts of these metals are derived can be monocarboxylic acids or dicarboxylic acids and the metallic salts can be either soluble or insoluble in the organopolysiloxane. Preferably, the salts employed are soluble in the organopolysiloxane since this facilitates the uniform dispersion of the salt in the reaction mixture.

Illustrative of metal salts which can be employed are, for example, zinc naphthanate, lead naphthanate, cobalt naphthanate, iron-2-ethylhexoate, cobalt octoate, zinc octoate, lead octoate, chromium octoate, tin octoate, and basic dimethyl tin oleate. Metal salts operative in the practice of the present invention include those in which the metallic ion contains a hydrocarbon substituent, such as, for example, carbomethoxyphenyl tin trisuberate, isobutyl tin triceroate, cyclohexenyl lead triacotinate, xenyl lead trisalicylate, dimethyl tin dibutyrate, dibutyl tin diacetate, dibutyl tin dilaurate, divinyl tin diacetate, dibutyl tin dibenzoate, dibutyl tin dioctoate, dibutyl tin maleate, dibutyl tin adipate, diisoamyl tin bis-trichlorobenzoate, diphenyl lead diformate, dibutyl tin dilactate, dicyclopentyl lead bismonochloroacetate, dibenzyl lead di-2-pentanoate, diallyl lead di-2-hexenoate, triethyl tin tartrate, tributyl tin acetate, triphenyl tin acetate, tricyclohexyl tin acrylate, tritolyl tin terephthalate, tri-n-propyl lead acetate, tristearyl lead succinate, trinaphthyl lead p-methylbenzoate, tris-phenyl lead cyclohexenyl acetate, triphenyl lead ethylmalonate, etc.

The amount of the metal salt of the organic carboxylic acid which can be employed is a function of the increased rate of curing desired so that any amount of such salt up to the maximum effective amount for increasing the cure rate can be employed. In general, no particular benefit is derived from employing more than about 5 percent by weight of such metal salt based on the weight of the organopolysiloxane base polymer. Preferably, where such metal salt is employed, it is present in an amount equal to from about 0.01 to 2.0 percent by weight, based on the weight of the base polymer.

The compositions of the room temperature vulcanizable rubber can also be varied by the incorporation of various extenders or fillers. Illustrative of the many fillers which can be employed are titanium dioxide lithopone, zinc oxide, zirconium silicate, silica aerogel, iron oxide, diatomaceous earth, calcium carbonate, fumed silica, precipitated silica, glass fibers, magnesium oxide, chromic oxide, zirconium oxide, aluminum oxide, crushed quartz, calcined clay, asbestos, carbon, graphite, cork, cotton, synthetic fibers, etc. When fillers are added to the silicone rubber compositions, they are generally employed in amounts of from about 10 to 200 parts filler per 100 parts of the organopolysiloxane base polymer.

In addition to the modification of the compositions of the present invention by the addition of metal salt cure accelerators and fillers, these compositions can also be modified by the incorporation of various flame retardants, stabilizing agents and plasticizers. Suitable flame retardants include antimony oxide, various polychlorinated hydrocarbons and organic sulfonates.

Where the composition of the present invention contain components other than the organotriacyloxysilane of formula (13) and the base fluid, the various ingredients can be added in any desired order. However, for ease of manufacturing, it is often convenient to form a blend or mixture of all of the components of the room temperature vulcanizing organopolysiloxane except the organotriacyloxysilane, to then remove moisture from the resulting mixture by maintaining the mixture under vacuum, and thereafter to add the organotriacyloxysilane prior to packaging of the compositions in containers protected from moisture. In addition to more conventional containers for bulk amounts of these materials, the materials can be packaged for convenient usage in caulking cartridges, squeeze tubes and the like. Of course, where it is desired to permit the curable composition to cure immediately upon formation, no special precautions need be taken.

To the liquid base polymer of formula (10) and the organotriacyloxysilane of formula (3) there may be added various adhesion promoters such as dialkoxydiacyloxysilanes of the formula:

(14) $(R^8O)_2Si(OY)$ where $R^8$ is a lower alkyl radical and Y is as previously defined. Such adhesion promoters are described in Kulpa, U.S. Pat. No. 3,296,161. Another specific adhesion promoter is the compound having the formula:

$[(CH_3)_3C-O]_2-Si-[OCOCH_3]_2$ which compound is added to the liquid base polymer of formula (10) and the organotriacyloxysilane of formula (13) so that the cured silicone rubber will adhere tenaciously to glass surfaces.

One particularly acceptable room temperature vulcanizable silicone rubber composition which is used to coat lightbulbs is:

| Component | Parts |
| --- | --- |
| (a) $HO(R_2^6SiO)_nH$ | 100 |
| (b) Tetramer Treated Filler | 20 |
| (c) $HC_3Si(OCCH_3)_3$ with O double bond | 80 |
| (d) An MTD Fluid Having $CH_3Si(OH)_3$ units, $(CH_3)_2Si(OH)_2$ units and $(CH_3)_3Si(OH)$ units | 15 |
| (e) Dibutyltindilaurate | 0.6 |
| (f) Cerium Neodecanoate | 0.35 |
| (g) $[(CH_3)_3CO]_2Si(OCCH_3)_2$ | 20 | where $R^6$ is methyl and phenyl. In preparing the composition components (a), (b), (d), (e), and (f) are mixed together. Then components (c) and (g) are added under anhydrous conditions. The mixture is then kept under anhydrous conditions while lightbulbs are brought into contact and coated with the mixture. The coated lightbulbs are then exposed to moisture in the atmosphere where the coating hardens to a rubber consistency.

Another room temperature vulcanizable composition that can be used to coat alkali glass surfaces is: Parts are by weight unless otherwise indicated.

| Component | Parts |
| --- | --- |
| (a) $HO(R_2^6SiO)_nH$ Penetration 1200–1500 | 100 |
| (b) DF 1040, 1.6 weight % hydride manufactured by General Electric, Silicone Products Department | .1 |
| (c) Dibutyl tin dioctoate | 1 |
| (d) Toluene (solvent) | 250 |
| (e) Cerium neodeconoate where $R^6$ is methyl or phenyl | .32 |

Other patents which disclose acceptable room temperature vulcanizable silicone rubber compositions useful in coating lightbulbs are Murphy U.S. Pat. No. 3,341,486 and Goossens U.S. Pat. No. 3,296,195.

The following examples are disclosed to illustrate the invention without intending to limit the invention in any way.

EXAMPLE 1

There was prepared a primer composition solution having the following components:

| Component | Parts |
| --- | --- |
| ES–40 | 2.5 |
| Ethylortho Silicate | 25.1 |
| Mineral Spirits | 63.2 |
| Tyzor TBT | 6.8 |
| Cerium Neodeconoate (8.92% Ce) | 2.4 |

The glass surface of a 100-watt lightbulb was cleaned and the bulb was immersed in the above solution. After the solvent evaporated a hard, clear, tenacious film was obtained on the lightbulb surface. The lightbulb was then immersed in room temperature vulcanizable silicone rubber having the following composition:

| Component | Parts |
| --- | --- |
| $HO(R_2^6SiO)_nH$ | 100 |
| Filler | 20 |
| MDT Fluid | 15 |
| $CH_3Si(OCCH_3)_3$ | 80 |
| Cerium Neodeconoate | 0.32 |
| Dibutyl tin dilaurate | 0.6 |
| $[(CH_3)_3CO]_2Si(OCCH_3)_2$ | 20 | where $R^6$ is methyl and phenyl.

The lightbulb was then exposed to atmospheric moisture for 24 hours whereupon a coating of silicone rubber having a hard rubber consistency was formed over the lightbulb surface. The lightbulb was then put into continuous use and after 65 days the silicone rubber coating was still clear without any sign of deterioration.

EXAMPLE 2

There was prepared a primer composition solution having the following components:

| Component | Parts |
| --- | --- |
| ES–40 | 2.5 |
| Ethylortho silicate | 25.1 |
| Mineral Spirits | 63.2 |
| Tyzor PB | 6.8 |
| Cerium Neodeconoate (8.92% Ce) | 2.4 |

The glass surface of a 100-watt lightbulb was cleaned and the bulb was immersed in the above solution. After the solvent evaporated a hard, crystal clear tenacious film was formed over the lightbulb surface. The film in this case was even more clear than that obtained with the primer composition of Example 1.

The lightbulb was then immersed in room temperature vulcanizable silicone rubber having the following composition:

| Component | Parts |
| --- | --- |
| $HO(R_2^6SiO)_2H$ | 100 |
| Filler | 20 |
| MDT Fluid | 15 |
| $CH_3Si(OCCH_3)_3$ | 80 |
| Dibutyl tin dilaurate | 0.6 |
| $[(CH_3)_3CO]_2Si(OCCH_3)_2$ | 20 | where $R^6$ is methyl and phenyl.

The lightbulb was then exposed to atmospheric moisture for 24 hours whereupon a coating of silicone rubber having hard rubber consistency was formed over the lightbulb surface. The lightbulb was then put into continuous use. After 65 days the silicone rubber coating was still clear without any sign of deterioration.

What I claim is:

1. A primer composition for protecting polysiloxane polymers from alkali surfaces comprising 1.0–10.0 percent by weight of $(RO)_nSiO_{(4-n)/2}$; 15.0–40.0 percent by weight of $(R'O)_4Si$; 1.0–10.0 percent by weight of a compound selected from the group consisting of $Ti(OR^2)_4$ and $Ti(OR^2)_x$; 1.0–5.0 percent by weight of

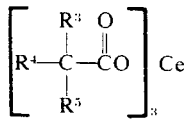

and 35.0–72.0 percent by weight of an inert solvent wherein R, R', $R^2$ represents a radical selected from the group consisting of alkyl; mononuclear and binuclear aryl; halogen-substituted mononuclear and binuclear aryl; nitro-substituted mononuclear and binuclear aryl; alkoxy-substituted mononuclear and binuclear aryl; alkenyl; haloalkyl; nitroalkyl; alkoxyalkyl and polyalkoxyalkyl; cycloaklyl, and alkyl, hydrogen, alkoxy and nitro-substituted cycloalkyl and cyanoalkyl; and aralkyl of up to 12 carbon atoms; $R^3$, $R^4$ and $R^5$ are selected from the group consisting of alkyl of not more than six carbon atoms; $x$ has a value of at least 5 and $n$ varies from 2.25 to 2.67.

2. The composition as set forth in claim 1 wherein the solvent is selected from the class consisting of toluene, xylene, acetone, benzene, lower aliphatic alcohols and mineral spirits.

3. The composition as set forth in claim 1 wherein the radicals R and R' are selected from the group consisting of methyl, ethyl and isopropyl.

4. The composition as set forth in claim 3 wherein $R^2$ represents butyl.

5. The composition as set forth in claim 1 wherein there is present 2.0–3.0 percent by weight of cerium neodeconoate.

6. The composition as set forth in claim 5 wherein there is present 20.0–30.0 percent by weight of ethylortho silicate.

7. The composition as set forth in claim 6 wherein there is present 5.0 to 8.0 percent by weight of the compound selected from the class consisting of $Ti(OR^2)_4$ and $Ti(OR^2)_x$.

8. The composition as set forth in claim 1 wherein there is present 1.5–3.0 percent by weight of $(RO)_nSiO_{(4-n)/2}$.

9. A process for protecting polysiloxane polymers from alkali surfaces comprising coating said alkali surfaces with a composition having therein 1.0–10.0 percent by weight of $(RO)_nSiO_{(4-n)/2}$; 15.0–40.0 percent by weight $(R'O)_4Si$; 1.0–10.0 percent by weight of a compound selected from the group consisting of $Ti(OR^2)_4$ and $Ti(OR^2)_x$; 1.0–5.0 percent by weight of

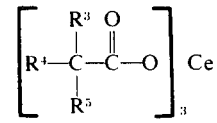

and 35.0–72.0 percent by weight of an inert solvent wherein R, R', and $R^2$ represent a radical selected from the group consisting of alkyl; mononuclear and binuclear aryl; halogen-substituted mononuclear and binuclear aryl; nitro-substituted mononuclear and binuclear aryl; alkoxy-substituted mononuclear and binuclear aryl; alkenyl; haloalkyl; nitroalkyl; alkoxyalkyl and polyalkoxyalkyl; cycloalkyl, and alkyl, halogen, alkoxy and nitro-substituted cycloalkyl and cyanoalkyl; and aralkyl of up to 12 carbon atoms; $R^3$, $R^4$, and $R^5$ are selected from the group consisting of alkyl of not more than six carbon atoms; $x$ has a value of at least 5 and $n$ may vary between 2.25 and 2.67.

10. The process as set forth in claim 9 wherein the solvent is selected from the class consisting of toluene, xylene, benzene, acetone, lower aliphatic alcohols, and mineral spirits.

11. The process as set forth in claim 9 wherein the radicals R, R' are selected from the group consisting of methyl, ethyl, and isopropyl.

12. The process as set forth in claim 11 wherein $R^2$ represents butyl.

13. The process as set forth in claim 12 wherein there is present 2.0–3.0 percent by weight of cerium neodeconoate.

14. The process as set forth in claim 13 wherein there is present 20.0–30.0 percent by weight of ethylortho silicate.

* * * * *